Oct. 27, 1959 R. MINNITE 2,909,862
FISH LURE
Filed June 6, 1958

RALPH MINNITE
INVENTOR
HUEBNER & WORREL
ATTORNEYS

2,909,862

FISH LURE

Ralph Minnite, Cantua Creek, Calif.

Application June 6, 1958, Serial No. 740,504

6 Claims. (Cl. 43—42.25)

The present invention relates to a fish lure and a method of making the same and more particularly to the use of a cottonseed with its attached cotton linters and fibers as an artificial insect simulating fish lure.

The use of a fish lure or artificial fly as an aid to catching fish is well-known. Such a fly is usually intended to be a simulation of a natural fly, insect, or other food object, and is usually constructed of feathers, threads, or tinsel, in a form intended to deceive the fish. Although there are innumerable different fly designs, flies normally include, in addition to a fishhook having a hook, a shank, and an eye; a body positioned on the shank of the hook adjacent to the eye, a wing frequently of feathers extended upwardly from the body and rearwardly from the eye, a hackle of small barbules of feather projecting downwardly from the body on the opposite side thereof from the wing and extended generally rearwardly from the eye, and a tail of quills or feathers connected to the body and extended rearwardly from the bend of the hook. Other refinements are known but have no particular connection with the subject invention. A wide variety of materials have been tried for constructing the body of a fly and these include animal fur, deer hair, wool yarn, silk floss, chenille, straw, and the like.

Conventionally such flies are made by hand either by companies in the business of selling fishing equipment or by individual fishermen according to their desires. It is generally accepted that certain basic tools and accessories are required for constructing good flies. Even with the proper tools, the fabrication of an effective fly is a time consuming, relatively exacting and usually a tedious process, especially for a beginner.

Artificial flies are constructed in such a configuration and of such materials as are intended to attract particular fish under anticipated fishing conditions. Certain flies are intended to float for dry fly fishing and others are intended for submergence.

Accordingly, it is an object of the present invention to provide an improved fish lure and method of making the same.

Another object is to use a cottonseed together with its attached linters and fibers as a fish lure.

Another object is to provide a fish lure which is relatively easy to obtain and which is low in cost.

Another object is to facilitate the fabrication of an artificial fly and attachment thereof to a fishhook.

Another object is to provide an artificial fly which is readily adapted to various fishing conditions and types of fish.

Another object is to provide an artificial fly which is easily colored.

Another object is to provide a fish lure which, although normally buoyant in the water, will sink readily upon attachment of a small weight to the fishline.

Another object is to minimize the time and inconvenience involved in preparing artificial flies.

These, together with other objects, will become more fully apparent upon reference to the following description. In the drawing.

Figure 1:
Fig. 1 is a side elevation of fishing tackle including a fish lure embodying the principles of the present invention.
Figure 2:
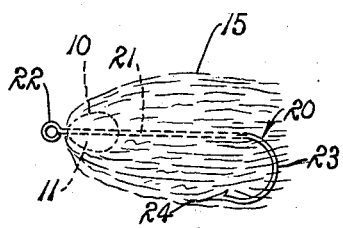
Fig. 2 is a somewhat enlarged view of the fish lure as mounted on a fishhook.
Figure 3:
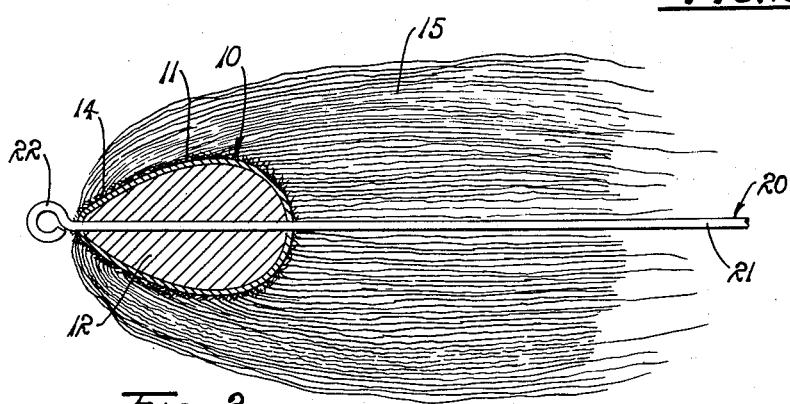
Fig. 3 is a still further enlarged view of the fish lure and a fragmentary view of the fishhook.
Figure 4:
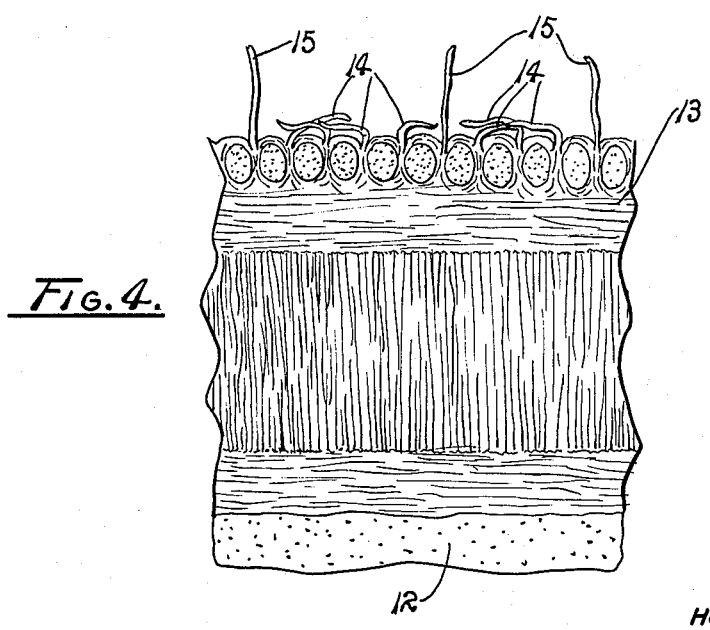
Fig. 4 is a still further enlarged fragmentary cross section of the cottonseed showing details which are pertinent to the present invention.

The essence of the subject invention resides in the discovery that a cottonseed together with its attached linters and staple cotton fibers is an excellent fish lure and that its use for this purpose minimizes many of the inconveniences conventionally associated with the tying and use of artificial flies.

Before describing the details of the subject invention, preliminary reference is made to a cottonseed, generally indicated by the numeral 10 in the drawing. A cottonseed includes an outer elongated, generally ovoidal hull 11 of horny although penetrable material which encloses and protects the seed kernel 12 and provides a pointed tip. North American upland cottonseeds, for example, usually provide hulls which vary between eight and twelve millimeters in length, are about four-tenths of a millimeter in minimum transverse width, and are of about seven-tenths of a millimeter in maximum transverse width. The hull includes an outer epiderm 13 which includes cotton linters 14 and cotton fibers 15, both of which constitute cellular elements of the epiderm and extend outwardly therefrom. The cotton linters and fibers are outgrowths from the outer layer of cells in the epiderm of the hull and are tenaciously held between the outer relatively large cells of the hull.

It will thus be seen that the hull is densely covered with the short cotton linters 14 which are sometimes referred to as fuzz. These linters are matted in an interwoven mass which encloses the hull. The relatively long staple cotton fibers 15, depending on the variety, range from about five-eighths of an inch to one and one-half inches in length. These longer fibers are more easily removed from the hull but nevertheless are still relatively tightly adherent thereto. As a result of the drying and curing of these fibers after the cotton boll opens, a wiriness or resiliency is imparted to the fibers which is manifested by an unfolding and fluffiness in the more robust of the fibers. These long fibers are usually removed by ginning but can be retained by plucking the boll from the hull by hand. They also can be trimmed or cut with scissors and are obviously easily and readily dyed in practically any color desired by well-known cotton dyes. Insofar as the present invention is concerned, it is also of significance that a cottonseed with its attached staple fibers and linters weighs only a fraction of an ounce and is buoyant in water.

In describing the method of forming an artificial fly in accordance with the subject invention, reference is made to a fishhook, generally indicated by the number 20 in the drawings. The hook provides an elongated shank 21 terminating at a forwardly disposed end in an eye 22 and having a rearwardly disposed return bend 23 terminating in a barbed point 24. Also for purposes of reference, the point is regarded as being disposed downwardly of the shank.

In order to make a fish lure from a cottonseed, as 10, the cottonseed is employed with its linters 14 and fibers 15 still attached. Preferably, the fibers are immersed in a suitable dye to impart a desired color to the fibers. Dyes providing fast colors which do not run in water are the types which are preferably employed. A significant advantage is that cotton is naturally an easy fiber to dye.

After the cottonseed 10 with its fibers 14 and 15 have been removed from the cotton boll, and dyed, as above explained, the hull 11 is impaled on the hook 20 by extending the point 24 substantially axially through the hull and sliding the hull around the bend 23 and onto the shank 21. Preferably, the hull is positioned adjacent to the eye 22. At this point it is to be noted that the cotton fibers normally project outwardly from the hull of a cottonseed in a direction generally rearwardly away from the pointed tip of the hull. For this reason the tip of the hull should be penetrated by the point first so that it is directed forwardly when the hull is positioned on the shank.

Comparing the cottonseed 10 on the fishhook 20 with a conventional artificial fly, it will be evident that the hull covered with the densely matted linters 15 simulates a body of the fly while the fibers projecting upwardly and downwardly from the hull respectively simulate the wings and hackles of the fly. Depending upon the relative length of the fibers and the fishhook, the fibers conceal the point to a greater or lesser degree. The fibers are preferably combed upwardly and downwardly to improve the appearance of the wings and hackles. It is sometimes desirable to trim the fibers, as with scissors, to remove certain fibers, or to shape the fly to suit individual desires and fishing conditions. For example, for trout fishing it may be desirable to strip some of the fiber off inasmuch as a relatively small fly is desirable. For larger fish, a cottonseed of maximum size and a full array of fibers is preferred.

In fishing, the fly 20 of the present invention is cast in the usual manner onto the water. The outwardly downwardly extended cotton fibers 15 tend to support the fly in imitation of the legs of a fly or other insect. Whereas for most conventional dry fly lures it is necessary to treat the materials to enable the fly to float, the fly 20 of the present invention is naturally buoyant on the water. However, it can be made to sink by using a split shot sinker, for example, connected to the fishline. Inasmuch as the subject fly is buoyant, it is especially easy to handle for beginners. Many so-called dry flies of the prior art are difficult to keep on the surface even for experienced fishermen.

In actual use of the invention, it has been found that the fly is effective and it has been used effectively to catch trout, bass, bluegill, and crappie, for example. Insofar as coloring of the fibers is concerned it has been found that blue resembles a shad or a minnow whereas other colors resemble other insects and larvae. It has been discovered that crappie and small mouth bass are particularly attracted to the yellow and red color flies of the present invention. Plain white or natural fibers have been effectively used in murky water.

From the foregoing it will be evident that unusual and unexpected results have been obtained from the use of a raw cottonseed and attached linters and fibers for an artificial insect simulating fish lure. In addition to its simplicity, particularly as compared with artificial flies of the prior art, it is vastly lower in cost and more easily obtainable than conventional flies. For example, a pound of cotton seed currently costs approximately thirty cents and produces approximately three-hundred or four-hundred lures. This is in marked contrast to conventional artificial flies which presently cost approximately thirty-five cents apiece.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fish lure comprising a fishhook, and a cottonseed impaled on the fishhook having linters and fibers adherent thereto, and partially concealing the fishhook.

2. A simulated fly for fishing purposes comprising a fishhook having an eye adapted for connection to a fish line, an elongated shank, and a return-bent, barbed point; and a cottonseed having linters and fibers adherent thereto mounted on the shank adjacent to the eye with said fibers extended from the seed in concealing relation to the barbed point.

3. The simulated fly of claim 2 in which the linters and fibers are colored for fish attracting purposes.

4. In a fishing lure including a fishhook, a device for concealing the fishhook and for luring fish thereto comprising a cottonseed including a hull impaled on the fishhook and adapted to float on the water during use of the lure, and elongated color dyable cotton fibers integrally attached to the hull as a part of the cottonseed and extended outwardly therefrom, the fishhook being located in concealed position among the fibers.

5. In a fishing lure for fly fishing providing a fishhook including an elongated shank, an eye, an arcuate bend and a point; an insect simulating device comprising a cottonseed having an elongated ovoidal hull impaled by the hook and positioned symmetrically on the shank and having a point adjacent to the eye, the hull yieldably frictionally resisting slidable movement longitudinally of the shank and being covered with short tenaciously coherent linters and thereby simulating the body of an insect, the cottonseed further having long staple cotton fibers tenaciously attached to the hull and extended outwardly therefrom in directions generally away from the eye toward the bend and the point and partially concealing the bend and point, the long fibers being spread on opposite sides of the shank to simulate the wings and hackles of an insect.

6. The lure of claim 5 wherein the combined fishhook and cottonseed is buoyant and is thus adapted to float on the water for purposes of dry fly fishing.

References Cited in the file of this patent

UNITED STATES PATENTS

| | | |
|---|---|---|
| 326,886 | Robinson | Sept. 22, 1885 |
| 1,395,533 | Tuttle | Nov. 1, 1921 |
| 2,038,940 | Knill | Apr. 28, 1936 |
| 2,216,929 | Zander et al. | Oct. 8, 1940 |
| 2,246,428 | Berlew | June 17, 1941 |